United States Patent
Chang et al.

(10) Patent No.: US 8,896,420 B2
(45) Date of Patent: Nov. 25, 2014

(54) RFID TAG, OPERATING METHOD OF RFID TAG AND OPERATING METHOD BETWEEN RFID TAG AND RFID READER

(75) Inventors: Wei Chang, Hsinchu Hsien (TW); Feng-Jian Chou, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 861 days.

(21) Appl. No.: 12/420,538

(22) Filed: Apr. 8, 2009

(65) Prior Publication Data
US 2009/0261951 A1    Oct. 22, 2009

(30) Foreign Application Priority Data
Apr. 16, 2008   (TW) .............................. 97113735 A

(51) Int. Cl.
| | |
|---|---|
| G06F 21/35 | (2013.01) |
| G06F 21/77 | (2013.01) |
| H04W 12/06 | (2009.01) |
| G06Q 30/06 | (2012.01) |
| G06K 7/00 | (2006.01) |
| H04L 29/06 | (2006.01) |
| G06F 21/31 | (2013.01) |

(52) U.S. Cl.
CPC ........... *H04W 12/06* (2013.01); *G06Q 30/0603* (2013.01); *G06K 7/0008* (2013.01); *H04L 63/083* (2013.01); *G06F 21/31* (2013.01)
USPC ...... 340/5.85; 340/5.26; 340/10.5; 340/10.51

(58) Field of Classification Search
CPC ... G06F 21/35; G06F 21/77; G06K 19/07309; H04L 2209/805; H04L 9/3226
USPC .................... 340/5.85, 5.26, 10.5, 10.51
See application file for complete search history.

(56) References Cited

U.S. PATENT DOCUMENTS

| | | | | |
|---|---|---|---|---|
| 7,298,243 | B2 * | 11/2007 | Juels et al. .................... 340/10.4 |
| 7,450,010 | B1 * | 11/2008 | Gravelle et al. ............ 340/572.1 |
| 7,942,335 | B2 * | 5/2011 | Kim et al. ..................... 235/492 |
| 8,441,342 | B2 * | 5/2013 | Amtmann .................... 340/10.5 |
| 2004/0059925 | A1 * | 3/2004 | Benhammou et al. ........ 713/189 |
| 2004/0243519 | A1 * | 12/2004 | Perttila et al. .................... 705/75 |
| 2006/0053112 | A1 * | 3/2006 | Chitkara et al. .................. 707/9 |
| 2007/0008070 | A1 * | 1/2007 | Friedrich ..................... 340/10.1 |
| 2007/0016479 | A1 * | 1/2007 | Lauper ............................ 705/14 |
| 2007/0103274 | A1 * | 5/2007 | Berthold .................... 340/10.51 |
| 2007/0114278 | A1 * | 5/2007 | Lauper ........................... 235/383 |
| 2007/0257768 | A1 * | 11/2007 | Bowers et al. ............... 340/5.61 |

* cited by examiner

Primary Examiner — Phung Nguyen
Assistant Examiner — John Bamert
(74) Attorney, Agent, or Firm — WPAT, PC; Justin King

(57) ABSTRACT

An RFID tag including a transmitting/receiving unit, a memory and a control unit. A first identification code, a second identification code, a password, and a set of data are stored in the memory. If the set of data is under protection, the set of data is accessible only when a verification procedure corresponding to the password is successfully performed. If the transmitting/receiving unit receives a request for accessing the second identification code, the control unit shall check whether the request includes the first identification code. As long as the checking result of the control unit is yes, even if the set of data is under protection and the verification procedure fails or the verification procedure is not successfully performed, the control unit shall still transmit the second identification code via the transmitting/receiving unit.

9 Claims, 5 Drawing Sheets

RFID TAG, OPERATING METHOD OF RFID TAG AND OPERATING METHOD BETWEEN RFID TAG AND RFID READER

CROSS REFERENCE TO RELATED PATENT APPLICATION

This patent application is based on a Taiwan, R.O.C. patent application No. 097113735 filed on Apr. 16, 2008.

FIELD OF THE INVENTION

The present invention relates to radio frequency identification (RFID) technology, and more particularly, to a management method applied to an RFID tag.

BACKGROUND OF THE INVENTION

RFID is a communication technology implementing a radio signal to identify a specific target and read/write related data. No physical or optical contact is needed between the specific target and a data reading system applying the RFID technology. As a result, data read/write speed of the data reading system is much faster than that of a traditional barcode device. Considering the RFID technology is widely applied to fields of logistics management, public consumption, identification and smart homes and offices and greatly improves user convenience, many companies are successively investing huge research and develop budgets on the RFID technology.

An RFID tag is classified into active and passive types according to whether a chip is provided with an internal power supply. Taking a passive RFID tag as an example, an antenna of the RFID tag receives a radio signal transmitted from an RFID reader within a specific distance, and power needed by a chip circuit is provided by a received radio wave. Once started, the chip circuit of the RFID tag automatically interprets the signal received by the antenna and selectively provides data demanded by the RFID reader in the form of a radio signal.

Concerning security, the present RFID tag is generally classified into open and closed types. Any RFID reader is capable of accessing the data stored in an open RFID tag, such as an identification number of the tag, or an origin and a date of manufacture of goods to which the tag is attached. The open type of RFID tag is usually applied to a logistics management and a library system with a relatively low security requirement. A possessor of the chip can encrypt the data stored in the tag to increase barriers preventing abuse of the data; however, the measure does not stop an illegal reader from accessing the data stored in the tag. Moreover, once an encryption method of the data stored in the tag is decrypted, other tags applying the same encryption method are also exposed to danger.

In contrast, a protection or verification mechanism is provided in an RFID tag of a closed system. In other words, the RFID reader needs to pass an authentication procedure provided inside the tag in order to read/write the data stored in the tag. For example, after obtaining the identification number of the tag, the RFID reader applies a specific encrypting mechanism to encrypt the identification number and transmits the encrypted identification number to the tag. The tag decrypts the encrypted identification number via a decrypting mechanism corresponding to the encrypting mechanism and verifies whether the decrypted result is correct. When the decrypted result is correct, the RFID reader is then allowed to access the data stored in the tag. As a result, software and hardware of the RFID tag and the RFID reader device are specially designed and even a new circuit, such as an encrypting or a decrypting circuit, is added.

The closed tag and reader are generally applied to an identification card system and a traffic pre-paid card system, in which the data is strictly controlled. The closed RFID system can provide a relatively better data protection; however, cost of the closed RFID system is much higher than that of the open RFID system, and is a heavy burden with respect to users that need to purchase and maintain a great deal of RFID devices and RFID tags.

In view of the foregoing issues, the encrypting mechanism of the reader corresponding to the decrypting mechanism of the tag need be built inside the reader/tag in advance. Furthermore, in order to reduce cost, circuits and functions are usually unchangeable, and cannot be reset or revised by an end-user. When the RFID tag is purchased, the encrypting/decrypting algorithm cannot be adapted or changed as desired by an end-user. Therefore, the readers/tags produced by different manufactures are incompatible with one another and cannot operate interchangeably, resulting in great limitations and user inconveniences.

SUMMARY OF THE INVENTION

In order to solve the problem mentioned above, a solution between an open RFID system and a closed RFID system is provided by the present invention.

An RFID tag according to one embodiment of the present invention comprises a transmitting/receiving unit, a memory and a control unit. The memory is stored with a first identification code, a second identification code, a password and a set of data. If the set of data is under protection, it is accessible only when a verification procedure corresponding to the password is successfully performed. In practice, the user can apply different passwords to represent whether the set of data is under protection. For example, when the password stored in the memory is equal to a predetermined value, the set of data is not under protection; when the password stored in the memory is not equal to the predetermined value, the set of data is under protection.

In addition, when the transmitting/receiving unit receives an identification request for accessing the second identification code, the control unit verifies whether the identification request comprises the first identification code. As long as the verification result of the control unit is yes, the control unit transmits the second identification code via the transmitting/receiving unit, even if the set of data is under protection and the password verification procedure fails or the password verification procedure has not been performed. In other words, the RFID reader need not pass an authentication procedure to access the first identification code and the second identification code of the RFID tag.

The RFID tag according to the present invention has two states, namely, an open state and a closed state, whereby disadvantages of the open RFID tag and the closed RFID tag are overcome to provide a high degree of autonomy as well as management flexibility in using the RFID tag. In addition, the password verification procedure of the RFID tag according to the present invention is rather simple, such that a complex built-in circuit or an algorithm is not needed by the RFID tag to achieve a similar function of protecting the data in the closed RFID tag.

Following description and figures are disclosed to gain a better understanding of the advantages of the present invention.

DETAILED DESCRIPTION OF THE PREFERRED EMBODIMENT

Figure 1:
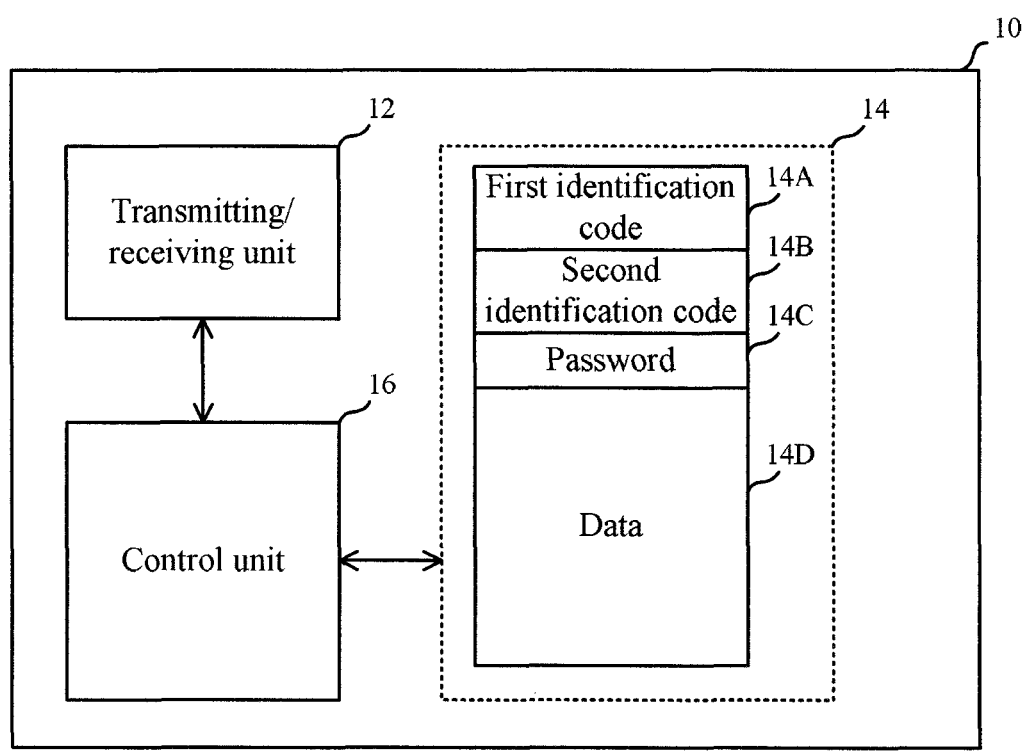
FIG. 1 is a block diagram of an RFID tag in accordance with an embodiment of the present invention.

FIG. 1 is a block diagram of an RFID tag in accordance with an embodiment of the present invention. An RFID tag 10 comprises a transmitting/receiving unit 12, a memory 14 and a control unit 16. The memory 14 has four different blocks: a block 14A stored with a first identification code, a block 14B stored with a second identification code, a block 14C stored with a password, and a block 14D stored with a set of data.

In practice, the first identification code is an electronic product code (EPC) of the RFID tag 10, a ubiquitous code or an RFID tag code specified by standards organizations such as the International Organization for Standardization (ISO). The codes are unique in principle. The second identification code is a specific code representing the user in possession of the RFID tag 10.

For example, after being directly written into the memory 14 in an unrewritable manner, the first identification code and the second identification code are made unchangeable by an instruction. When the password of the block 14C is designed to be rewritable, a correct previous password needs to be entered before writing in a new password. When the password of the block 14C is designed to be unrewritable, for example, after being written into the block 14C, the password is made unchangeable by an instruction.

According to the present invention, the RFID tag 10 has two different states. When the block 14D is not under protection, any RFID reader capable of communicating with the RFID tag 10 can access the data stored in the block 14D. Under such circumstances, the RFID tag 10 is regarded as a traditional open RFID tag. On the contrary, when the block 14D is under protection, the data stored in the block 14D is accessible only when the RFID reader passes a password verification procedure corresponding to the password. Under such circumstances, the RFID tag 10 is regarded as a closed RFID tag. The data stored in the block 14D can be encrypted when the possessor/administrator of the RFID 10 wishes to increase security of the data.

For example, different passwords are applied by the administrator of the RFID 10 to indicate whether the set of data is under protection. When the password stored in the block 14C is equal to a predetermined value, such as 00000000, the set of data is not under protection; on the contrary, when the password stored in the block 14C is not equal to the predetermined value, the set of data is under protection.

When the transmitting/receiving unit 12 receives a request for accessing the block 14D, the block 14C is checked by the control unit 16. When it is found that the block 14C is stored with the password 00000000, the control unit 16 shall command the transmitting/receiving unit 12 to transmit the data stored in the block 14D corresponding to the access request. On the contrary, when the password stored in the block 14C is not equal to 00000000, the control unit 16 shall perform the verification procedure with respect to the access request.

According to the present invention, the verification procedure is rather simple. For example, the administrator can set the RFID tag 10 in advance. When the access request of the RFID reader comprises the password recorded in the block 14C, the control unit 16 determines the access request successfully passes the password verification procedure. In other words, when the password stored in the block 14C is 10011100, the data stored in the block 14C is accessible only when the request of the RFID reader comprises the password 10011100. When another request associated with the block 14D is transmitted from the RFID reader, such as a request for writing data in the block 14D, the RFID tag 10 determines whether to accept the request according to the password verification procedure.

Figure 2A:
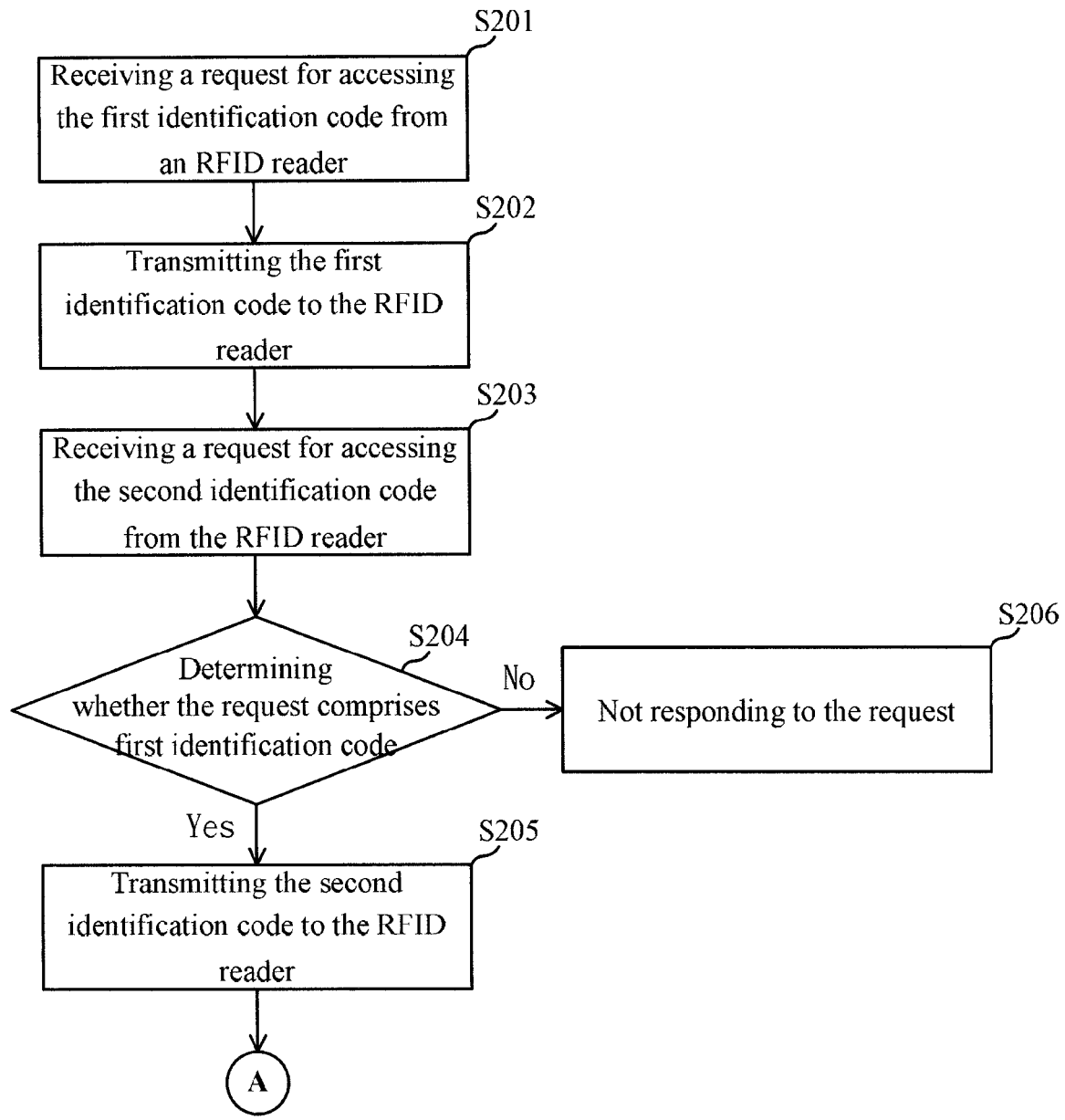
FIG. 2(A) and FIG. 2(B) is an example of a flowchart of an operation of an RFID tag in accordance with an embodiment of the present invention.
Figure 2B:
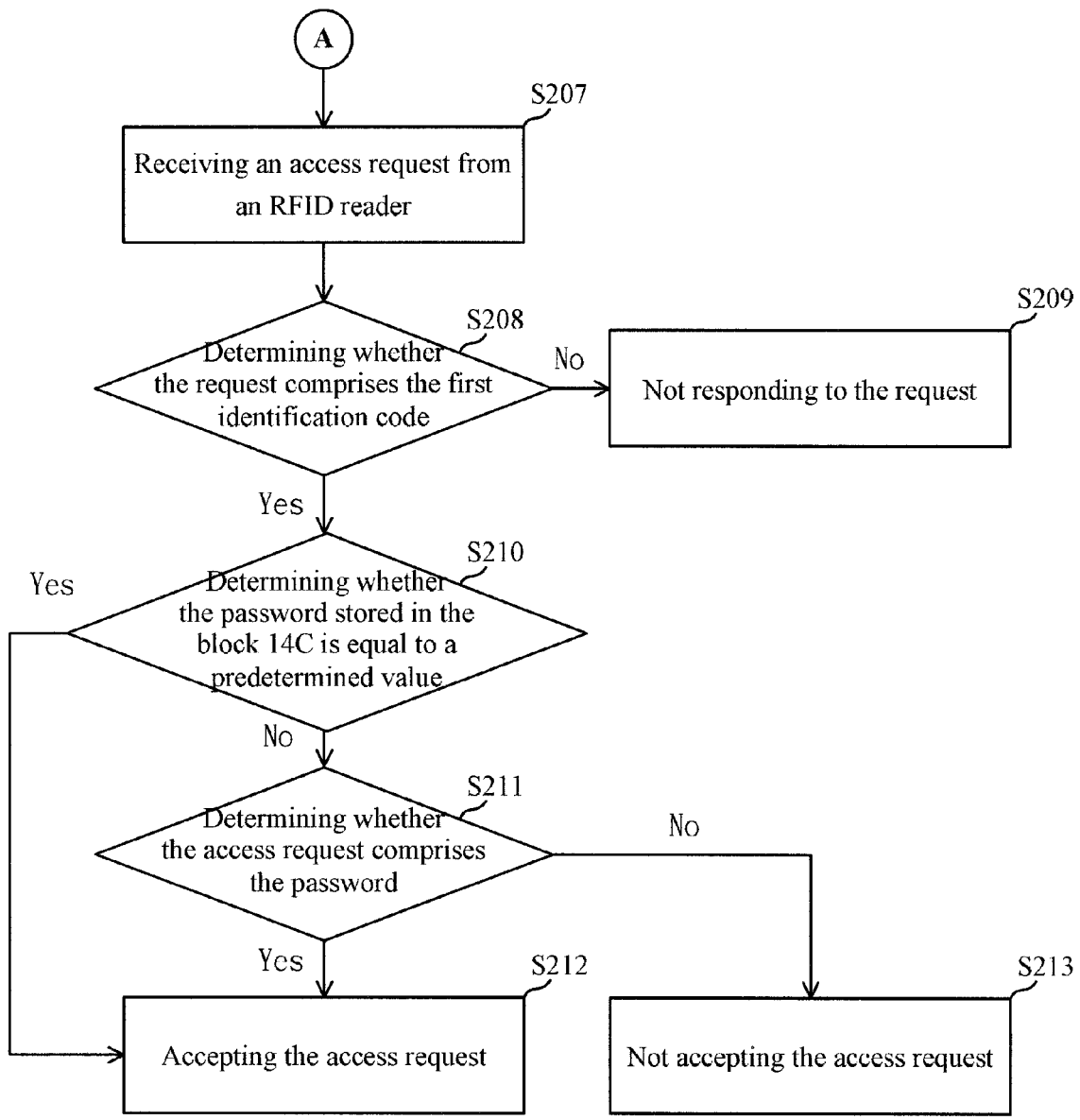

Refer to FIG. 2(A) and FIG. 2(B) showing an example of a flowchart of an operation of the RFID tag 10. In Step S201, the RFID tag 10 receives, via the transmitting/receiving unit 12, a request for accessing the first identification code from an RFID reader. In Step S202, in response to the request, the RFID tag 10 transmits the first identification code stored in the block 14A to the RFID reader. In Step S203, the RFID tag 10 receives, via the transmitting/receiving unit 12, a request for accessing the second identification code from the RFID reader. In Step S204, the RFID tag 10 determines whether the request comprises the first identification code.

When the result of Step S204 is no, it implies that the request is not transmitted with respect to the RFID tag 10 and therefore the RFID tag 10 shall not respond to the request for accessing the second identification code, as in Step S206. On the contrary, when the result of S204 is yes, the RFID tag 10 executes Step S205 of transmitting the second identification code to the RFID reader. In other words, even if the data stored in the block 14D is under protection and the request does not comprise the password of the RFID tag 10, that is, the verification procedure is not performed or not successfully performed, the RFID tag 10 shall still transmit the second identification code as long as the result of Step S204 is yes.

In Step S207, the RFID tag 10 receives the access request from the RFID reader via the transmitting/receiving unit 12. In Step S208, the RFID tag 10 determines whether the request comprises the first identification code of the RFID tag 10. When the result of Step S208 is no, it implies that the request is not transmitted with respect to the RFID tag 10 and therefore the RFID tag 10 shall not respond to the access request, as in Step S209.

On the contrary, when the result of Step S208 is yes, the RFID tag 10 determines whether the password stored in the block 14C is equal to a predetermined value, as in Step S210. When the result of Step S210 is yes, the RFID tag 10 accepts the access request in Step S212. When the result of Step S210 is no, the RFID tag 10 determines whether the access request comprises the password, as in Step S211. When the result of S211 is yes, the RFID tag 10 accepts the access request in Step S212. When the result of Step S211 is no, the RFID tag 10 shall not accept the access request, as in Step S213.

The password verification procedure in the foregoing example is apparently different from a complex password verification procedure of a conventional closed RFID system. A complex built-in circuit or an algorithm need not be provided in the RFID tag to achieve a function similar to the function of protecting the data stored in the closed RFID system.

It is to be noted that, the RFID tag 10 has two different operation states. It is easy that the RFID tag 10 be adjusted to an open mode or a closed mode by way of changing content of the block 14C. For the RFID reader, the RFID tag 10 in the open mode behaves identically to a conventional open RFID tag. As a result, the RFID tag 10 is accessible to various RFID readers.

The block 14C can be modified by the user, thereby providing a high degree of autonomy as well as flexible management of the RFID tag 10, so that the password can be set without necessarily applying an algorithm provided by a manufacturer of an RFID system. For example, the possessor/ administrator of the RFID tag may unify all of the passwords under the protection state to be a specific value such as 10011100 or set different passwords for tags according to different RFID readers.

Figure 3:
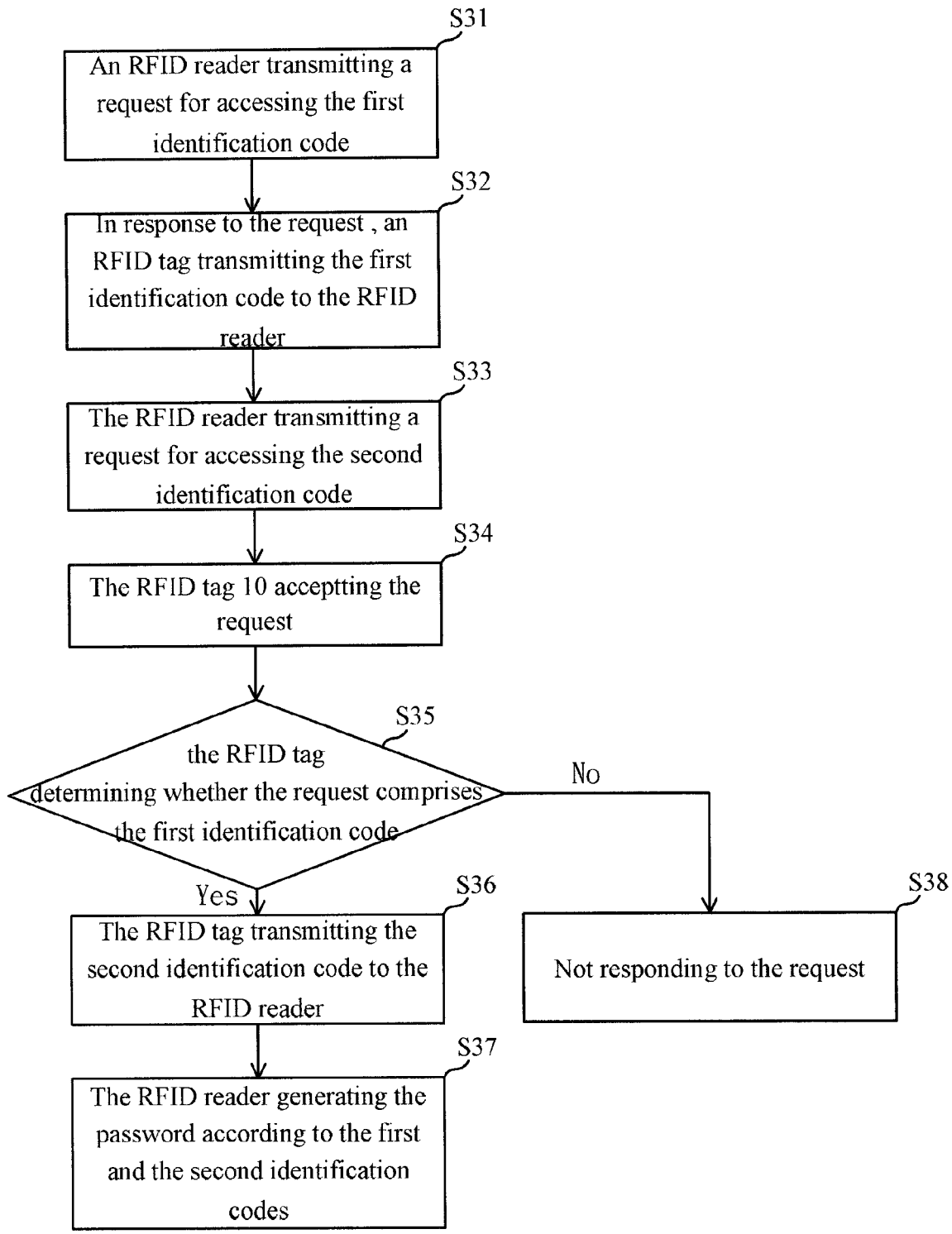
FIG. 3 is an example of a communication mode between an RFID tag and an RFID reader in accordance with an embodiment of the present invention.

In this embodiment of the present invention, the password is associated with two identification codes respectively stored in the blocks 14A and 14B. According to the present invention, the RFID reader need not pass the verification procedure to access the first identification code and the second identification code of the RFID tag 10. Refer to FIG. 3 showing an example of a communication mode between the RFID 10 and an RFID reader.

In Step S31, the RFID reader transmits a request for accessing the first identification code of the RFID tag 10. In Step S32, in response to the request accepted, the RFID tag 10 transmits the first identification code stored in the block 14A to the RFID reader. In Step S33, the RFID reader transmits a request for accessing the second identification code of the RFID tag 10. In Step S34, the RFID tag 10 accepts the request. In Step S35, the RFID tag 10 determines whether the request comprises the first identification code.

When the result of Step S35 is no, it implies that the request is not transmitted with respect to the RFID tag 10 and therefore the RFID tag 10 does not respond to the request for accessing the second identification code, as in Step S38. On the contrary, if the result of Step S35 is yes, the RFID tag 10 executes Step S36 of transmitting the second identification code to the RFID reader. In other words, even if the data stored in the block 14D is under protection and the request does not comprise the password of the RFID tag 10, that is, the password verification procedure fails or the password verification is not performed or not successfully performed, the RFID tag 10 shall transmit the second identification code as long as the result of Step S35 is yes.

Referring to FIG. 3, after receiving the first identification code and the second identification code of the RFID tag 10, the RFID reader generates the password of the RFID tag 10 under protection according to two identification codes, as in Step S37. For example, the possessor/administrator uses the first identification code and the second identification code as inputs of a specific algorithm, and an output of which is the password of the RFID tag 10 under protection. As long as the specific algorithm is obtained in advance, the RFID reader is capable of obtaining the correct password for accessing or writing the block 14D.

Compared to the RFID tag, the RFID reader and/or the subsequent software and hardware thereof have/has more powerful computational capabilities and greater adjustment flexibilities and therefore are able to utilize all kinds of both simple and complex algorithms. Moreover, the possessor/administrator of the RFID tag 10 may apply the RFID reader or an related server to generate the password and write the computational result into the RFID tag 10. Even if the specific algorithm mentioned above is rather complex, a corresponding complex computational circuit need not be provided in the RFID tag 10. Hence, cost of hardware of the RFID tag 10 is lower than that of the traditional closed RFID tag.

In practice, supposing the password of the RFID tag 10 is designed to be rewritable, when the transmitting/receiving unit 12 receives a request for changing the password, the control unit 16 checks whether the request comprises the password, which is the original password. When the result is yes, the password is allowed to be changed by the control unit 16.

Figure 4:
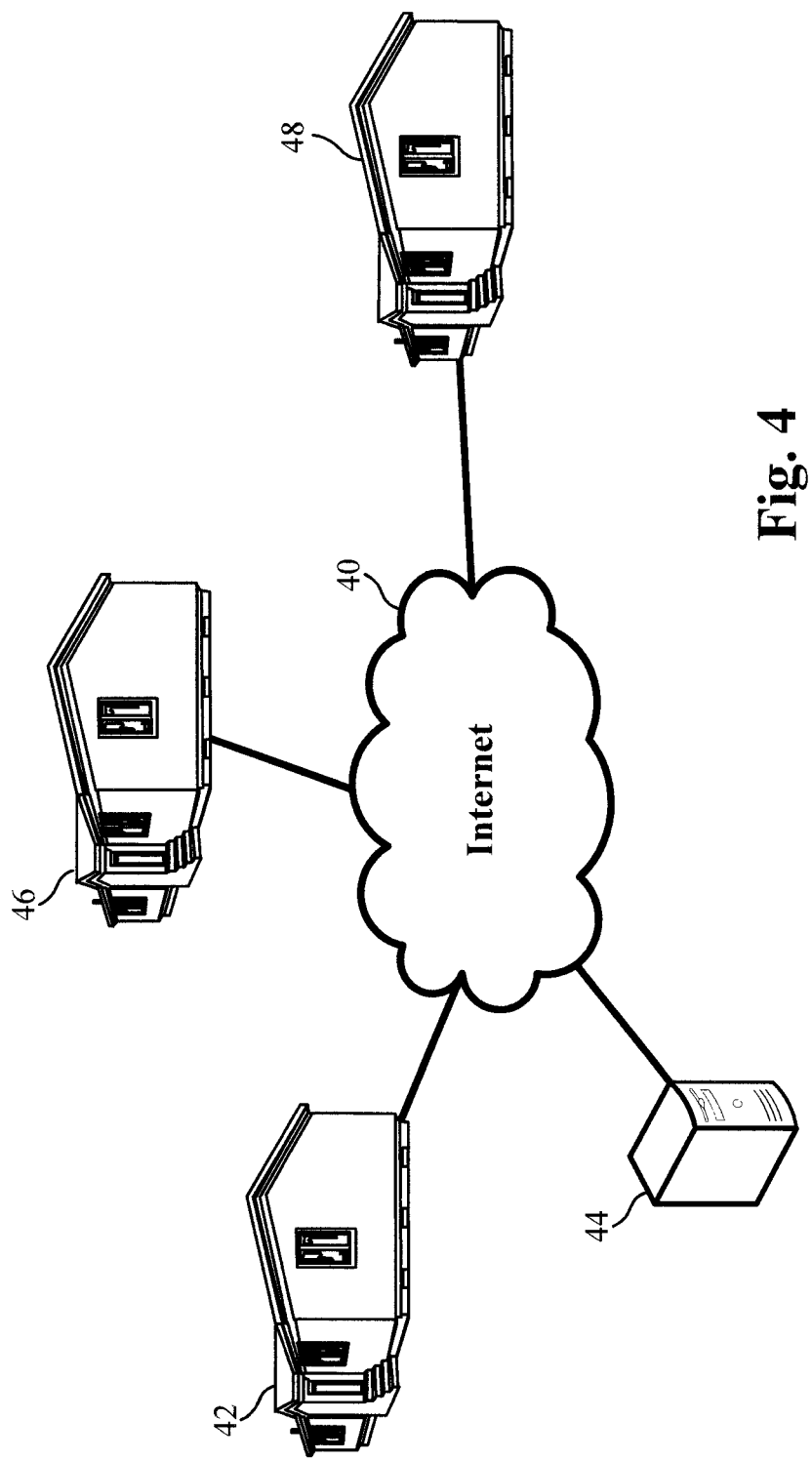
FIG. 4 is a schematic diagram of a logistics process associated with an RFID tag.

Refer to FIG. 4 showing a schematic diagram of a logistics process associated with an RFID tag. A good produced in a manufacturing plant 42 is attached with the RFID tag 10 according to the present invention. Manufacture data associated with the good, such as a manufacture date, an expiration date or a producer code, is written into the block 14D of the RFID tag 10 by the producer or is transmitted to a specific server 44 via the Internet 40. According to the present invention, the second identification code of the RFID tag 10 is set as an Internet protocol address of the server 44.

A logistics service provider further delivers the good via a transfer station 46 to a sales department 48. During the good delivering process, the transfer station 46 and the sales department 48 record a set of data associated with the good, such as receiving hours and a license number of a lorry, so as to provide the administrator or purchaser with details of the good for future inquiries. The transfer station 46 and the sales department 48 can access the Internet protocol address stored in the block 14B and transmit the set of data to the server 44 via the Internet 40.

Apparently, a capacity of the block 14D is rather large if the set of data associated with the good is recorded in the RFID tag 10. In order to save memory space and to lower cost of hardware of the RFID tag 10, centralizing the set of data associated with the good in the server 44 is a convenient and effective method. When inquiring the data associated with the good, the administrator or the purchaser applies the RFID reader to access the Internet protocol address stored in the block 14B, and the associated data in the server 44 can then be read via the Internet 40.

Referring to the embodiments mentioned above, the RFID tag according to the present invention has two different states of an open type and a closed type, whereby disadvantages of the open RFID tag and the closed RFID tag are overcome to provide a high degree of autonomy as well as management flexibility in using the RFID tag. In addition, the password verification procedure according to the present invention is rather simple, such that a complex circuit or an algorithm need not be built in the RFID tag to achieve a function similar to the function of protecting the data stored in the closed RFID system.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification (RFID) tag, comprising:
    a transmitting/receiving unit;
    a memory, configured for storing digital information, comprising:
        a first identification code;
        a second identification code;
        a set of data; and
        a password, being one of a predetermined value indicating that the set of data is not under protection or a value not equal to the predetermined value obtained by an encryption of the first identification code and the second identification code with a predetermined algorithm indicating that the set of data is under protection, wherein the predetermined value is assigned by the manufacture or determined by the design of the RFID tag, wherein the predetermined value is not received from an interrogating RFID reader and cannot be changed by a user during an operation; and a control unit, coupled to the transmitting/receiving unit and the memory, configured for performing a password verification procedure prior to access of the set of data under protection when the password is determined to be the value not equal to the predetermined value, checking whether a request for accessing the second identification code received by the transmitting/receiving unit comprises the first identification code, and transmitting the second identification code via the transmitting/receiving unit if the request for accessing the second identification code does comprise the first identification code, even when the password stored in the memory is determined to be the value not equal to the predetermined value and the password verification procedure fails;

wherein the RFID tag is configured to operate in either an open mode dictating any RFID reader can access data stored therein, or a closed mode dictating said password verification procedure is required to access the set of data under protection.

2. The RFID tag as claimed in claim 1, wherein the password is generated according to the first identification code and the second identification code.

3. An operating method of an RFID tag stored a first identification code, a second identification code, a set of data, and a password being one of a predetermined value indicating that the set of data is not under protection or a value not equal to the predetermined value obtained by an encryption of the first identification code and the second identification code with a predetermined algorithm indicating that the set of data is under protection, the set of data being accessible when a password verification procedure corresponding to the password is successfully performed prior to access of the set of data when under protection, the operating method comprising steps of:

(a) receiving a request for accessing the second identification code;

(b) checking whether the request comprises the first identification code; and (c) transmitting the second identification code when the step (b) is yes, even when the password stored in the memory id determined to be the value not equal to the predetermined value and the verification procedure fails wherein the RFID tag is configured to operate in either an open mode dictating any RFID reader can access data stored therein, or a closed mode dictating said password verification procedure is required to access the set of data under protection;

wherein the predetermined value is assigned by the manufacture or determined by the design of the RFID tag, wherein the predetermined value is not received from an interrogating RFID reader and cannot be changed by a user during an operation.

4. The operating method as claimed in claim 3, further comprising steps of:

(d1) receiving a password changing request for changing the password;

(d2) checking whether the password changing request comprises the password; and (d3) allowing the password to be changed when the step (d2) is yes.

5. An operating method between an RFID tag and an RFID reader, wherein the RFID tag stores a first identification code, a second identification code, a set of data, and a password being one of a predetermined value indicating that the set of data is not under protection or a value not equal to the predetermined value obtained by an encryption of the first identification code and the second identification code with a predetermined algorithm indicating that the set of data is under protection, wherein the set of data is accessible when a password verification procedure is successfully performed prior to access of the set of data when under protection while the password is determined to be the value not equal to the predetermined value, the operating method comprising steps of:

(a) transmitting a second-identification-code request for accessing from the RFID reader;

(b) receiving the second-identification-code request by the RFID tag and determining whether the second-identification-code request comprises the first identification code; and (c) transmitting the second identification code from the RFID tag to the RFID reader if the step (b) is yes, even when the password stored in the memory is determined to be the value not equal to the predetermined value and the password verification procedure fails;

wherein the RFID tag is configured to operate in either an open mode dictating any RFID reader can access data stored therein, or a closed mode dictating said password verification procedure is required to access the set of data under protection;

wherein the predetermined value is assigned by the manufacture or determined by the design of the RFID tag, wherein the predetermined value is not received from an interrogating RFID reader and cannot be changed by a user during an operation.

6. The operating method as claimed in claim 5, further comprising steps prior to the step (a):

transmitting a first-identification-code request for accessing the first identification code from the RFID reader; and receiving the first-identification-code request by the RFID tag and transmitting the first identification code to the RFID reader.

7. The operating method as claimed in claim 5, further comprising a step of:

(d) generating the password by the RFID reader or a back-end computer device coupled to the RFID reader according to the first identification code and the second identification code.

8. The operating method as claimed in claim 5, wherein the set of data is encrypted.

9. The operating method as claimed in claim 5, further comprising steps of:

(d1) transmitting a password changing request from the RFID reader for changing the password;

(d2) receiving the password changing request by the RFID tag and checking whether the password changing request comprises the password; and (d3) allowing the password to be changed when the step (d2) is yes.

* * * * *